United States Patent [19]

Koriyama

[11] Patent Number: 5,220,890
[45] Date of Patent: Jun. 22, 1993

[54] VARIABLE COMPRESSION DEVICE FOR TWO CYCLE DIESEL ENGINE

[75] Inventor: Masao Koriyama, Iwata, Japan

[73] Assignee: Yamaha Hatsudoki Kabushiki Kaisha, Iwata, Japan

[21] Appl. No.: 778,449

[22] Filed: Oct. 16, 1991

[30] Foreign Application Priority Data

Oct. 25, 1990 [JP] Japan .................... 2-287517
Jul. 18, 1991 [JP] Japan .................... 3-203290

[51] Int. Cl.$^5$ .................... F02B 75/02; F02B 27/06
[52] U.S. Cl. .................... 123/65 PE; 123/65 V
[58] Field of Search .............. 123/65 P, 65 PE, 65 V, 123/323

[56] References Cited

U.S. PATENT DOCUMENTS

| | | | |
|---|---|---|---|
| 4,121,552 | 10/1978 | Mithuo et al. | 123/65 V |
| 4,364,346 | 12/1982 | Shiohara | 123/65 PE |
| 4,622,928 | 11/1986 | Lichinishi | 123/65 PE |
| 4,706,617 | 11/1987 | Asai et al. | 123/65 PE |
| 4,807,571 | 2/1989 | Yamamoto et al. | 123/65 PE |
| 4,911,115 | 3/1990 | Boyesen | 123/65 PE |
| 5,000,131 | 3/1991 | Masuda | 123/65 PE |

FOREIGN PATENT DOCUMENTS

| | | | |
|---|---|---|---|
| 0381163 | 8/1990 | European Pat. Off. | |
| 0382063 | 8/1990 | European Pat. Off. | |
| 0173817 | 7/1988 | Japan | 123/65 PE |
| 0246410 | 10/1988 | Japan | |
| 0272916 | 11/1988 | Japan | |

OTHER PUBLICATIONS

Pat. Abstracts of Japan-vol. 12, No. 289 (M728) Aug. 8, 1988, JP-A-60 249,615 Oct. 12, 1985.
Pat. Abstracts of Japan-vol. 10, No. 122 (M476) (2179) Jul. 5, 1986 and JP-A-60 249 615 Oct. 12, 1985 (U.S. equivalent cited).

*Primary Examiner*—Willis R. Wolfe
*Attorney, Agent, or Firm*—Ernest A. Beutler

[57] ABSTRACT

A variable compression ratio mechanism for a two cycle diesel engine embodying auxiliary exhaust passages and auxiliary exhaust ports that communicate with the cylinder above the main exhaust ports and in which control valves are positioned for controlling the opening and closing of the auxiliary exhaust ports to change the effective compression ratio of the engine to minimize dead space between exhaust control valves and the auxiliary exhaust ports, the exhaust control valves are positioned in close proximity to the cylinder and comprise valve elements that operate in bores that are disposed substantially parallel to the cylinder bore. Both rotary and reciprocating type valves are disclosed and various mechanisms are disclosed for interlinking the control valves for simultaneous operation. In addition, the positioning of the auxiliary exhaust passages permits the formation of a cooling jacket between them that cools not only the auxiliary exhaust passages but also the control valves and the main exhaust passage. Embodiments are shown of adapting these principals to multiple cylinder engines and in which the main exhaust passages are formed in an acute angle to a plane containing the axes of the cylinder bores so as to permit a compact construction.

49 Claims, 16 Drawing Sheets (a)

(b)

VARIABLE COMPRESSION DEVICE FOR TWO CYCLE DIESEL ENGINE

BACKGROUND OF THE INVENTION

This invention relates to a variable compression device for a two cycle diesel engine and more particularly to an improved valve arrangement for controlling a pair of auxiliary or sub-exhaust ports for varying the compression ratio of an engine.

It has been proposed to provide an arrangement for varying the compression ratio in an engine and particularly a two cycle engine so as to improve its performance through out its load and speed ranges. This expedient is particularly useful in conjunction with diesel engines as it permits the use of high compression ratios for starting, low and mid speed operation without providing a high compression ratio at high speed that can give rise to thermal and emission problems. One way in which the compression ratio can be varied, is by providing a pair of auxiliary or sub-exhaust ports that open into the cylinder bore at a higher point than the main exhaust port. By opening and closing the sub-exhaust ports, the timing of the beginning of the exhaust cycle can be changed and the compression ratio effectively altered. However, there are certain problems with the prior art constructions that can be best understood by reference to FIGS. 1 and 2 of the drawings.

FIGS. 1 and 2 are respectively cross sectional views taken through a plane extending perpendicular to the cylinder bore axis and parallel to the cylinder bore axis. As may be seen, a cylinder 51 is formed with a cylinder bore 52 in which a piston 53 reciprocates. A main exhaust port 54 extends through a side of the cylinder 51 and permits exhaust gases to flow, through a main exhaust passage 55 that extends through the cylinder 51 and which communicates with an exhaust manifold (not shown).

At circumferentially spaced locations above the main exhaust port 54, there are provided a pair of sub or auxiliary exhaust ports 56 that communicate with auxiliary exhaust passages 57 formed in the cylinder 51 and which intersect the main exhaust passage somewhere downstream of the main exhaust port 54.

An exhaust control valve assembly, indicated generally by the reference numeral 58 is supported within a transversely extending bore 59 formed in the cylinder 51 for controlling the opening and closing of the auxiliary exhaust ports 56. As may be seen, when the auxiliary exhaust ports 56 are closed, the piston 53 will sweep past them but no exhaust gases can be discharged from the exhaust passage 55 until the main exhaust port 54 is opened. This has the effect of providing a high effective compression ratio. To lower the compression ratio, the exhaust control valve 58 is rotated from its closed position to an opened position so that the auxiliary exhaust ports 56 will open earlier in the downward movement of the piston 53 and reduce the effective pressure and, accordingly, the compression ratio.

As may be seen, when the exhaust control valve 58 is provided for controlling both of the auxiliary exhaust ports 57, as is desirable to maintain a simple construction, the valving surfaces 61 of the valve 58 must be spaced at a location from the cylinder bore 52 to provide a thin body of cylinder block material 62 between the bore 59 and the cylinder bore 52 for strength purposes. As a result, there are dead spaces 63 formed between the ports 56 and the valve surfaces 59 which in effect lower the compression ratio and hence do not make the engine as efficient as is desirable. In addition, because of the intervening body of cylinder block material 62, the exhaust control valve 58 is not effectively cooled and thermal problems can occur.

It is, therefore, a principal object to this invention to provide an improved variable compression device for an internal combustion engine which permits a high compression ratio and yet a simple and compact construction.

It is a further object to this invention to provide a simplified and compact variable compression ratio mechanism for an engine that will not adversely effect the compression ratio or the cooling ability for the exhaust control valve.

It is a further object to this invention to provide an improved variable compression device for an internal combustion engine wherein the exhaust control valve that controls the exhaust port timing will be adequately cooled.

SUMMARY OF THE INVENTION

The features of the invention are adapted to be embodied in a two cycle internal combustion engine that comprises a cylinder having an opening for receiving a reciprocating piston and a main exhaust port opening through the cylinder and opened and closed by the piston. A pair of auxiliary exhaust ports are spaced around the cylinder and also opened and closed by the piston. The auxiliary exhaust ports are opened by the movement of the piston before the main exhaust port is opened by the piston. Exhaust control valves selectively open and close the auxiliary exhaust ports for changing the effective compression ratio of the engine.

In accordance with a first feature of the invention, a line extending between the inner peripheral edges of the exhaust control valves when in their closed positions intersects the cylinder opening for maintaining a minimum dead volume in the auxiliary exhaust ports between the cylinder opening and the exhaust control valves.

In accordance with another feature of the invention, a cooling jacket is formed in the cylinder in the area between the auxiliary exhaust ports for cooling the auxiliary exhaust ports and the exhaust control valve.

BRIEF DESCRIPTION OF THE DRAWINGS

FIG. 6 is cross sectional view, in part similar to FIG. 4, and shows the exhaust control valves in their opened positions while FIG. 4 shows them in their closed positions.

FIG. 16 is a cross sectional view, in part similar to FIG. 14, and shows the exhaust control valves in their opened positions while FIG. 14 shows them in their closed positions.

DETAILED DESCRIPTION OF THE PREFERRED EMBODIMENTS OF THE INVENTION

Figure 1:
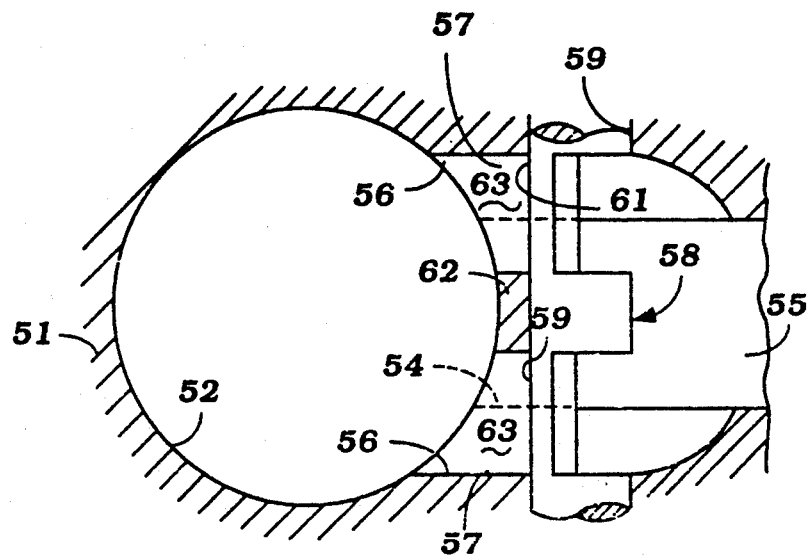
FIG. 1 is a cross sectional view taken on a plane extending perpendicular to the cylinder bore axis in accordance with a prior art construction.
Figure 2:
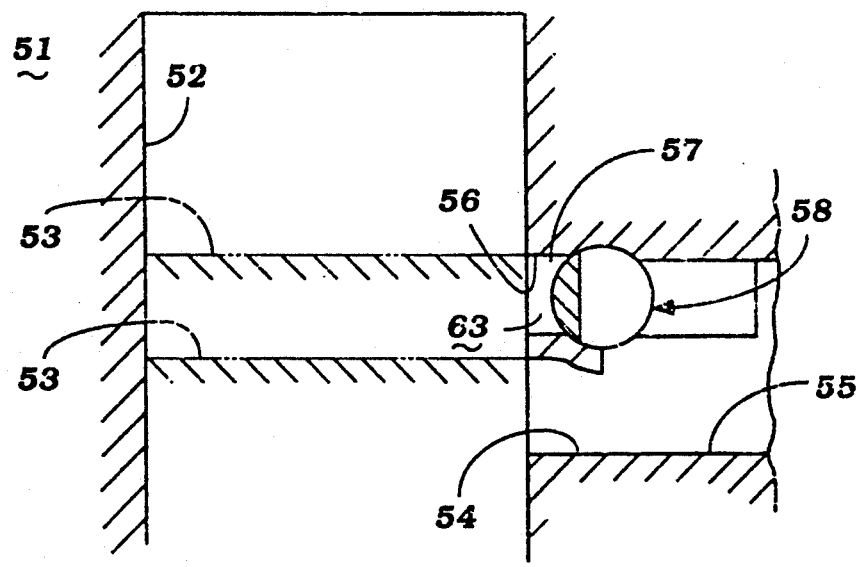
FIG. 2 is a cross sectional view taken along a plane perpendicular to the plane of FIG. 1 in the prior art construction.
Figure 3:
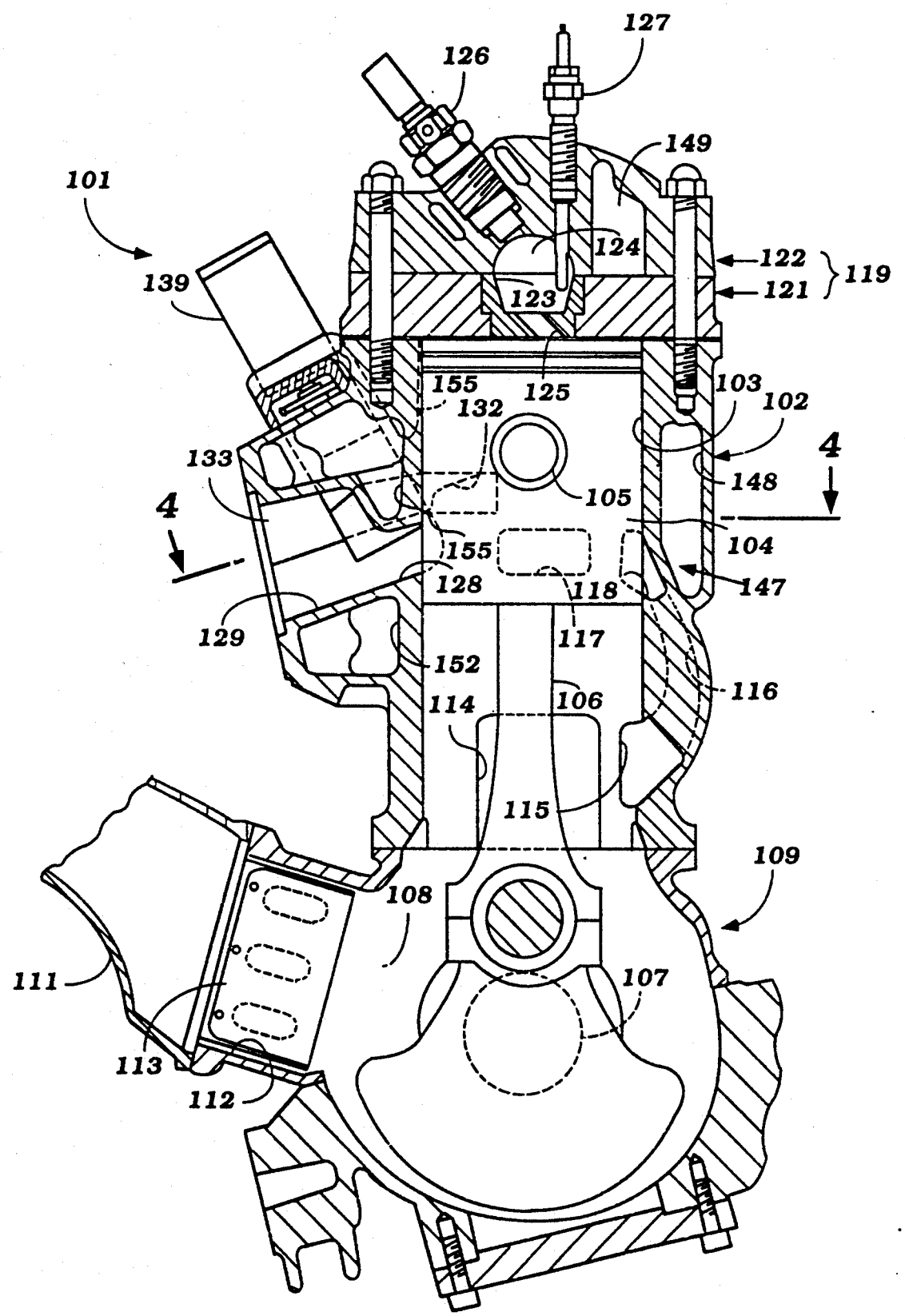
FIG. 3 is a cross sectional view taken through a cylinder of an internal combustion engine constructed in accordance with a first embodiment of the invention.

A single cylinder, two cycle, crankcase compression internal combustion engine constructed in accordance with a first embodiment of the invention is identified generally by the reference numeral 101 and is shown in FIGS. 3 through 10. As will become readily apparent, although the invention is described in conjunction with a single cylinder engine it may be applied to engines having multiple cylinders. Also, the described engine operates o a diesel cycle but it is to be understood that certain facets of the invention may be employed with spark ignited engines. However, the invention has particular utility in conjunction with two cycle diesel engines.

The engine 101 is comprised of a cylinder block 102 which is formed with a cylinder opening or bore 103 in which a piston 104 is supported for reciprocation. The piston 104 is connected by means of a piston pin 105 to the upper or small end of a connecting rod 106. The opposite end of the connecting rod 106 is journalled on a throw of a crankshaft 107. The crankshaft 107 is rotatably journalled in a crankcase chamber 108 formed by a crankcase member 109 that is affixed to the cylinder block 102 in a known manner and by the lower portion of this cylinder block.

An air charge is admitted to the crankcase chamber 108 from an air inlet device (not shown) that supplies air to a manifold 111. The manifold 111 communicates with an inlet port 121 formed in the crankcase member 109. A reed type check valve 113 is positioned in the intake port 112 so as to permit flow into the crankcase chamber 108 when the piston 104 is moving upwardly and to preclude reverse flow when the piston 104 moves downwardly to compress the charge within the crankcase chamber 108.

The compressed charge is transferred from the crankcase chamber 108 to the area above the head of the piston 104 through a plurality of scavenge passages having inlet openings in the crankcase chamber 108. In the illustrated embodiment, there are three circumferentially spaced scavenge passages that are comprised of paired openings 114 and a single central opening 115 (FIG. 9) that are formed in the lower end of the cylinder block 102. These inlet openings communicate with scavenge passages 116 formed in the cylinder block 102 and terminate at respective discharge or scavenge ports 117 and 118 opening into the cylinder bore 103.

A cylinder head assembly 119 is affixed to the cylinder block 102 and encloses the upper end of the cylinder bore 103. In the illustrated embodiment, the cylinder head assembly 119 is made up of a multiple piece construction including a lower part 121, an upper part 122 and an insert piece 123. The insert piece and the upper part 122 define a pre-combustion or torch chamber 124 that communicates with the main combustion chamber through an opening 125 formed in the insert piece 123.

A fuel injector 126 injects fuel into the pre-chamber 124 at an appropriate time and due to the high temperature caused by the compressed charge, the fuel will ignite and expand into the main chamber through the orifice 125. A glow plug 127 may be positioned in the cylinder head in communication with the precombustion or torch chamber 124 to assist in cold starting.

As the gases burn and expand, they will drive the piston 104 downwardly to repeat the cycle. The exhaust gases then exit through a main exhaust port 128 which is diametrically opposed to the scavenge port 118 and which communicates with a main exhaust passage 129 extending through the cylinder block 102 and which communicates with an exhaust manifold (not shown)

for eventual discharge to the atmosphere through a suitable exhaust system.

In accordance with the invention, a pair of auxiliary exhaust ports 132 extend through the cylinder from the bore 103 at circumferentially space locations and vertically above the main exhaust port 128. These auxiliary exhaust ports 132, as may be best seen in FIG. 9, overlap circumferentially the main exhaust port 128. The auxiliary exhaust ports 132 communicate with respective auxiliary exhaust passages 133 formed in the cylinder block 102 and which intersect the main exhaust passage 129 so that the exhaust gases admitted through the auxiliary exhaust ports 132 can flow through the same exhaust system.

Figure 4:
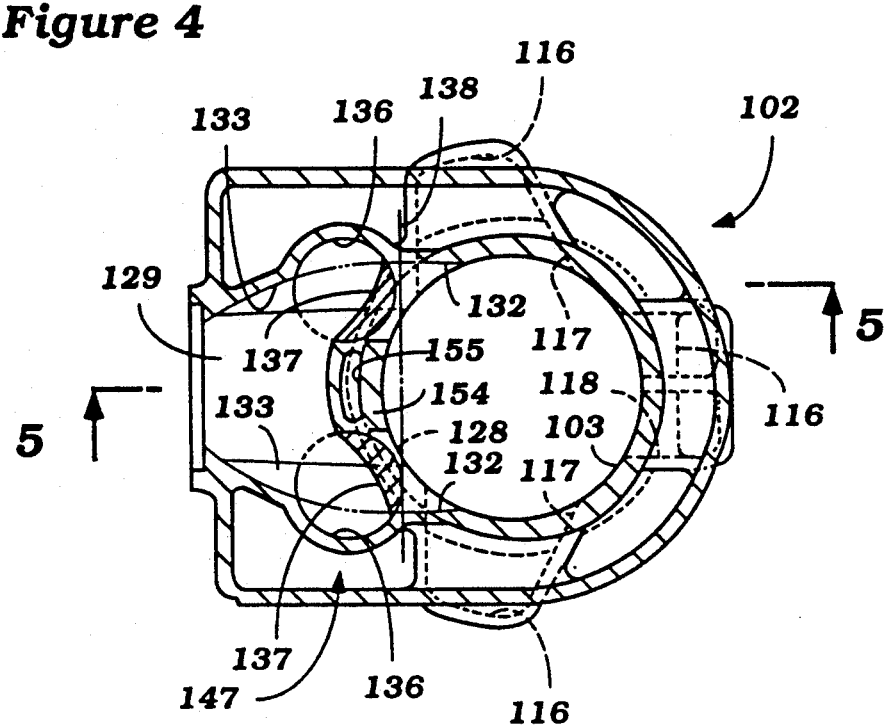
FIG. 4 is a cross sectional view taken along the line 4—4 of FIG. 3.

The opening and closing of the auxiliary exhaust ports 132 is controlled by a respective exhaust control valve 134 each of which is comprised of a cylindrical body 135 that is rotatably journalled in a cylindrical bore 136 which intersects the main exhaust passage 129 but which is inclined at a small angle to the vertical and disposed at a small acute angle to the axis of the cylinder bore 103. Because of this disposition, the inner surfaces of the valving portions 137 when in their fully closed position, as shown in FIG. 4, lie along a line 138 which line passes through the cylinder bore 103 or the opening formed thereby. As a result, there is very little dead area between the opening of the auxiliary exhaust ports 132 and the valving surface 137 as would lower the compression ratio as is true with the prior art type of constructions.

Figure 5:
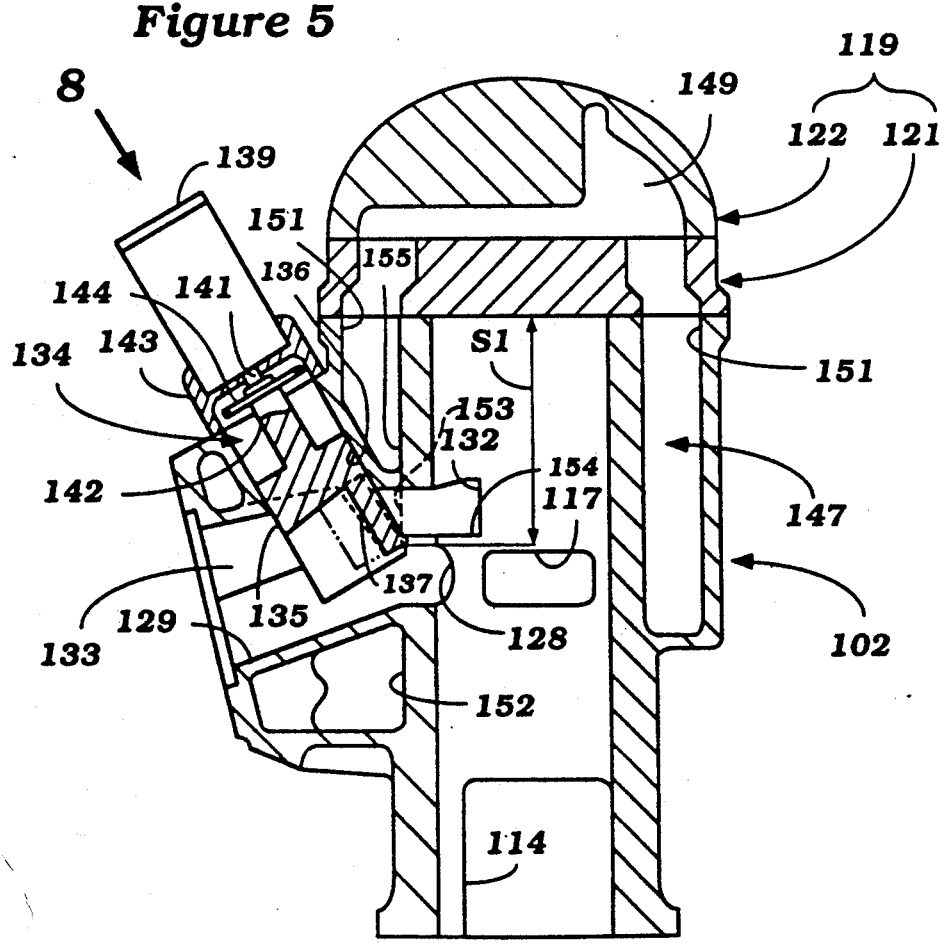
FIG. 5 is a cross sectional view taken along the line 5—5 of FIG. 4.
Figure 6:
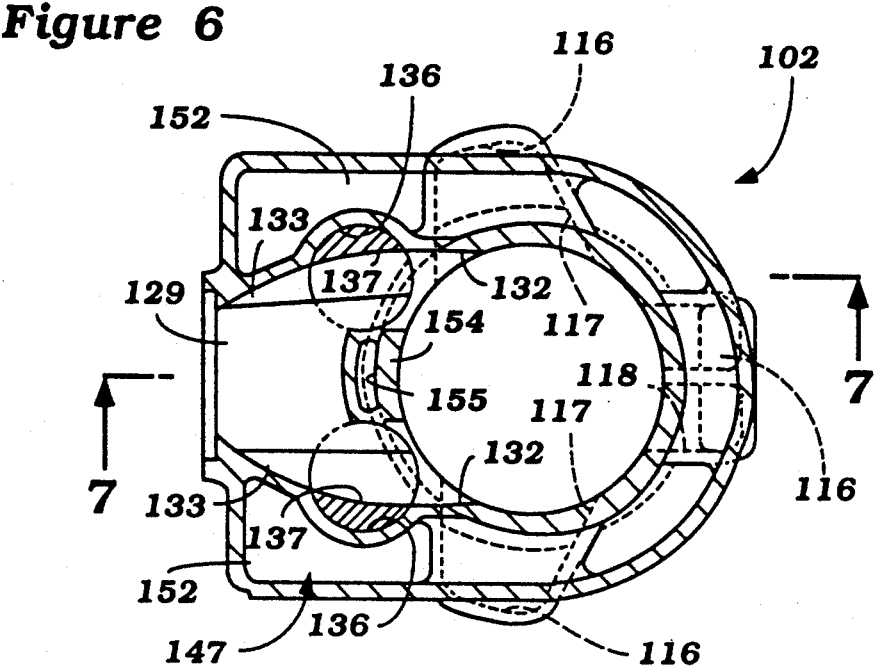
Figure 7:
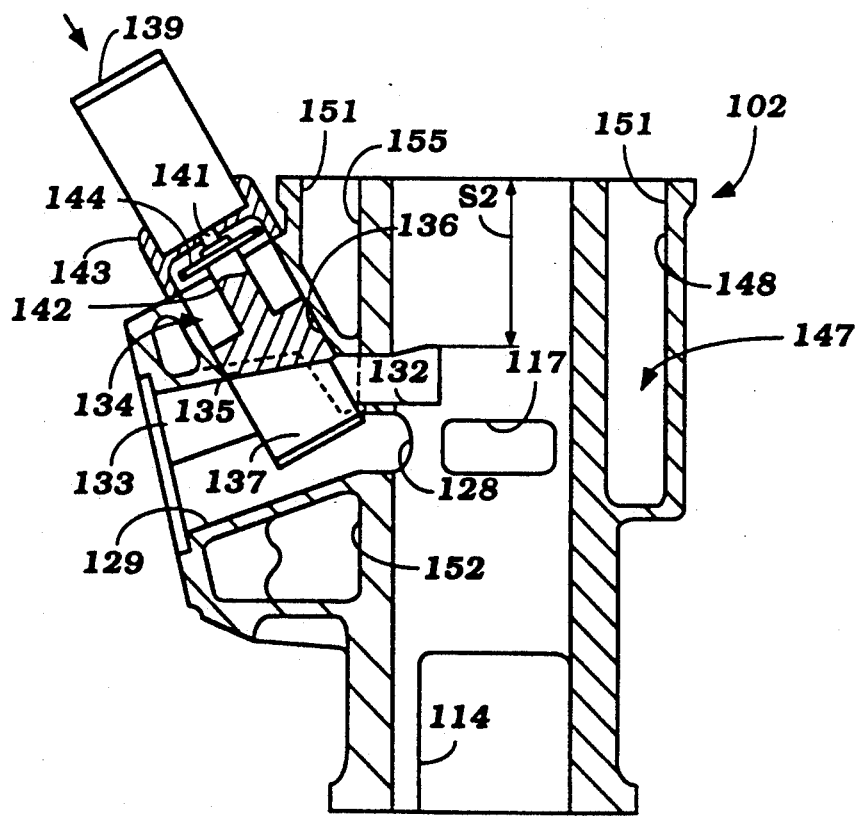
FIG. 7 is a cross sectional view taken along the line 7—7 of FIG. 6.
Figure 8:
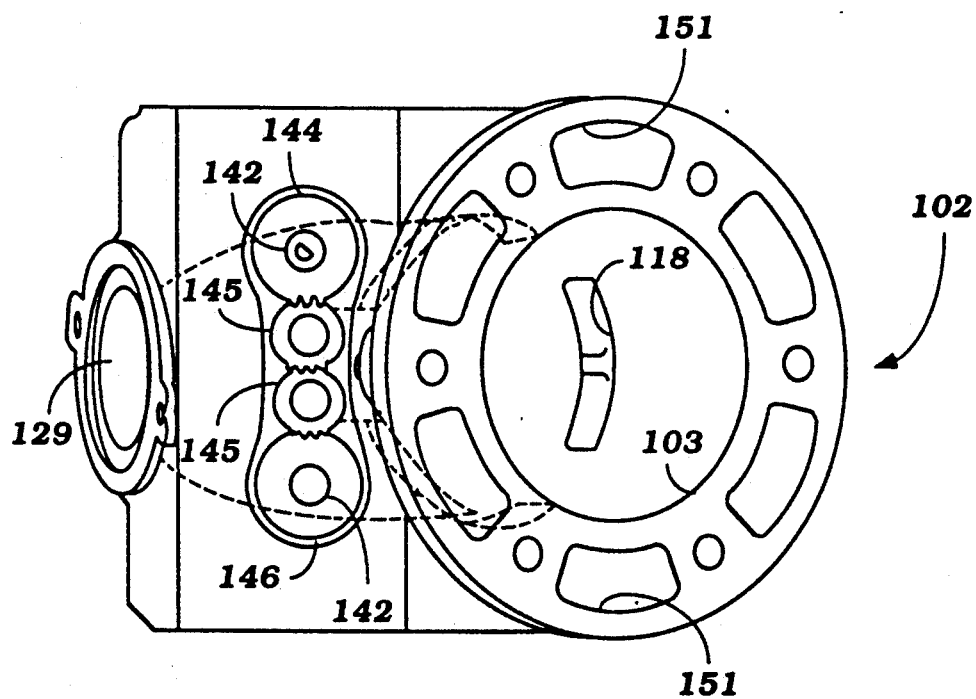
FIG. 8 is a view looking in the direction of the arrow 8 in FIG. 5 and shows the arrangement for operating the exhaust control valves.
Figure 9:
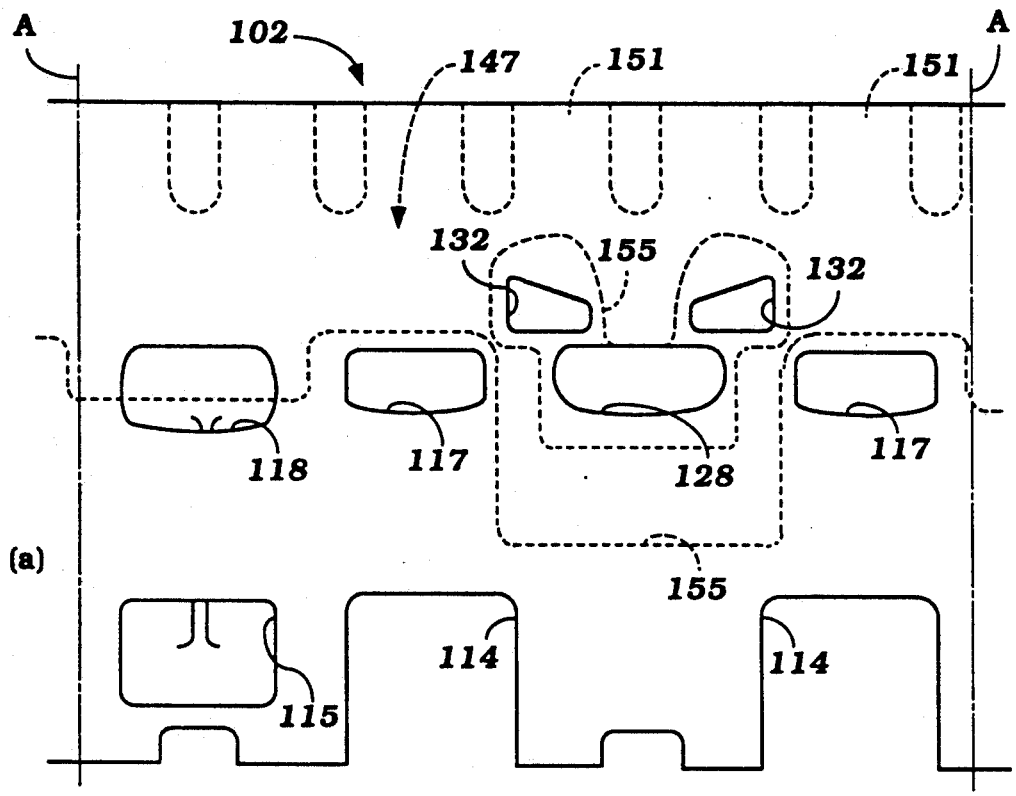
FIG. 9 is a develop view showing the port configuration in this embodiment.

A single electrically operated stepping motor 139 has an output shaft 141 that is coaxial with a stem 142 of one of the control valves 134 and which is rotatably coupled to it in a suitable manner. The motor 139 is mounted on a mounting boss 143 formed at a side of the cylinder block 102. A gear 144 is affixed for rotation with the valve shaft 142 and is enmeshed with a pair of parallel timing gears 145 which are journalled in the mounting portion 143 in a suitable manner. One of the gears 145 meshes with a further gear 146 that is affixed to the shaft 142 of the remaining control valve 134 s that the control valves 134 will be operated in unison from their closed position as shown in FIGS. 4 and 5 to their opened position as shown in FIGS. 6 and 7 while rotating in opposite directions. When closed, the exhaust port will not open until the piston descends the distance S1 from its top dead center position so as to open the main exhaust port 128. As a result, an extremely high effective compression ratio will result. However, when the exhaust control valves 134 are in their open position as shown in FIGS. 4 and 7, the auxiliary exhaust ports 132 will open when the piston descends the distance S1, much sooner, and a lower effective compression ratio will result.

FIG. 4 is a torque speed curve and the area covered by the shaded line B is the area when the exhaust control valves 134 are closed and the compression ratio raised. This is basically the low speed, low power range wherein the higher compression ratio can be tolerated to provide good fuel economy. However, as the speed and load increases, problems of knocking, high temperature and adverse exhaust emissions, particularly NOx emissions become a problem. This is avoided by opening of the exhaust control valves 134, in the manner as aforedescribed, and reducing the compression ratio.

The engine 101 is further provided with a cooling system including a cooling jacket, indicated generally by the reference numeral 147 which includes a cylinder block cooling jacket portion 148 and a cylinder head cooling jacket portion 149 which communicate with each other through ports 151 formed in the upper end of the cylinder block cooling jacket portion 148 and the lower surface of the cylinder head. The cylinder block cooling jacket portion 148 also has a portion 152 that extends around the main exhaust port 129. With prior art type of constructions, however, it was not possible to provide cooling between the individual exhaust control valves 134 due to the positioning of the horizontal shaft therebetween as aforedescribed.

In accordance with the invention, however, there is provided a cylinder block portion 154 that extends between the auxiliary exhaust ports 132 and which defines a cooling jacket 155 which can communicate with the cylinder head cooling jacket portion 149 or the cylinder block cooling jacket portion 148 so as to provide very effective cooling not only for the auxiliary exhaust ports 132 but also the exhaust control valves 134 and the upper portion of the main exhaust passage 129. As a result, extremely effective cooling is provided as well as the aforenoted other advantages.

Figure 10:
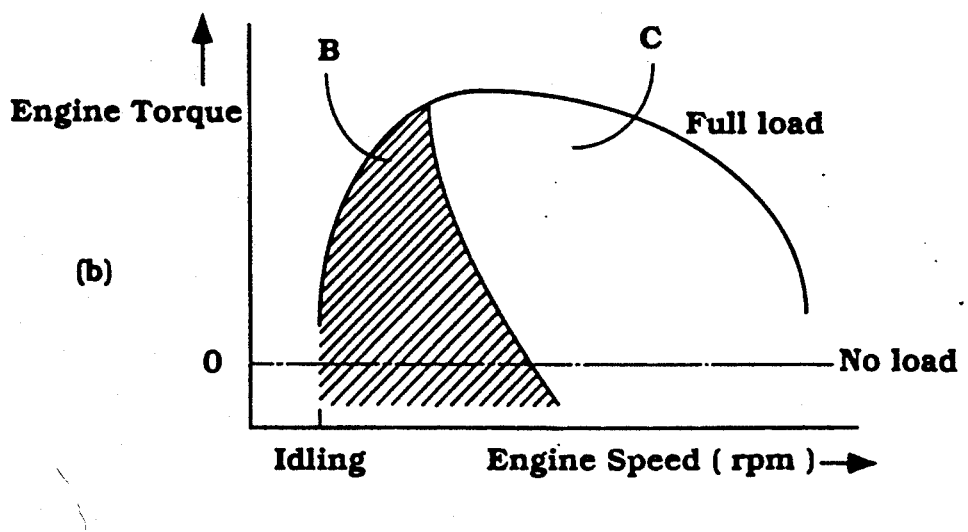
FIG. 10 is a graphical view showing the range of operation when the compression ratio is changed in this embodiment.
Figure 11:
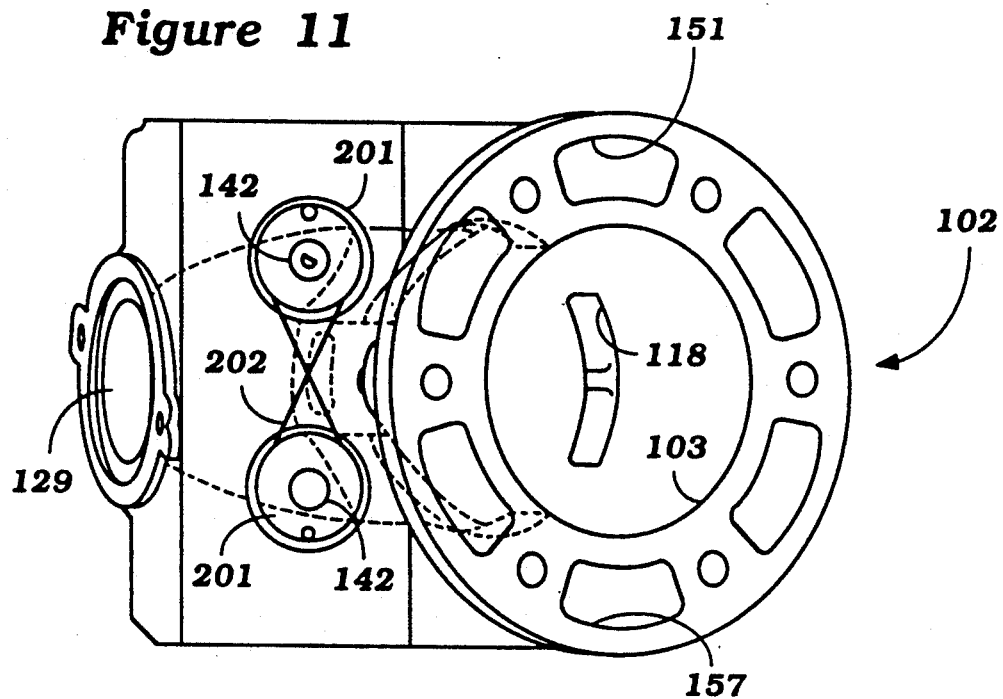
FIG. 11 is a view, in part similar to FIG. 8, and shows another embodiment of valve operating mechanism.
Figure 12:
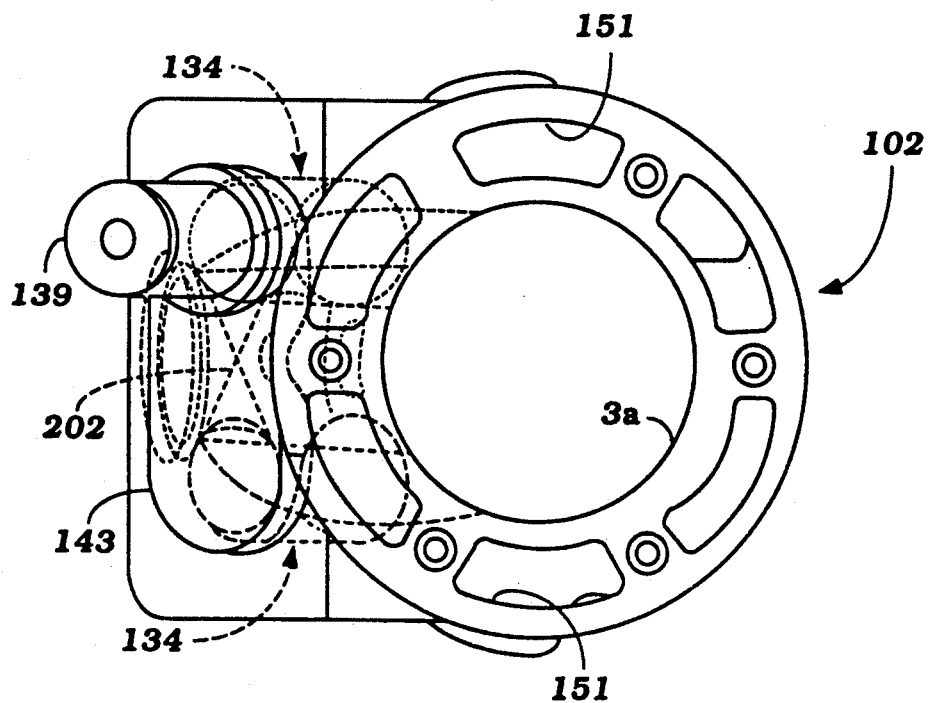
FIG. 12 is a top plane view of this embodiment.
Figure 13:
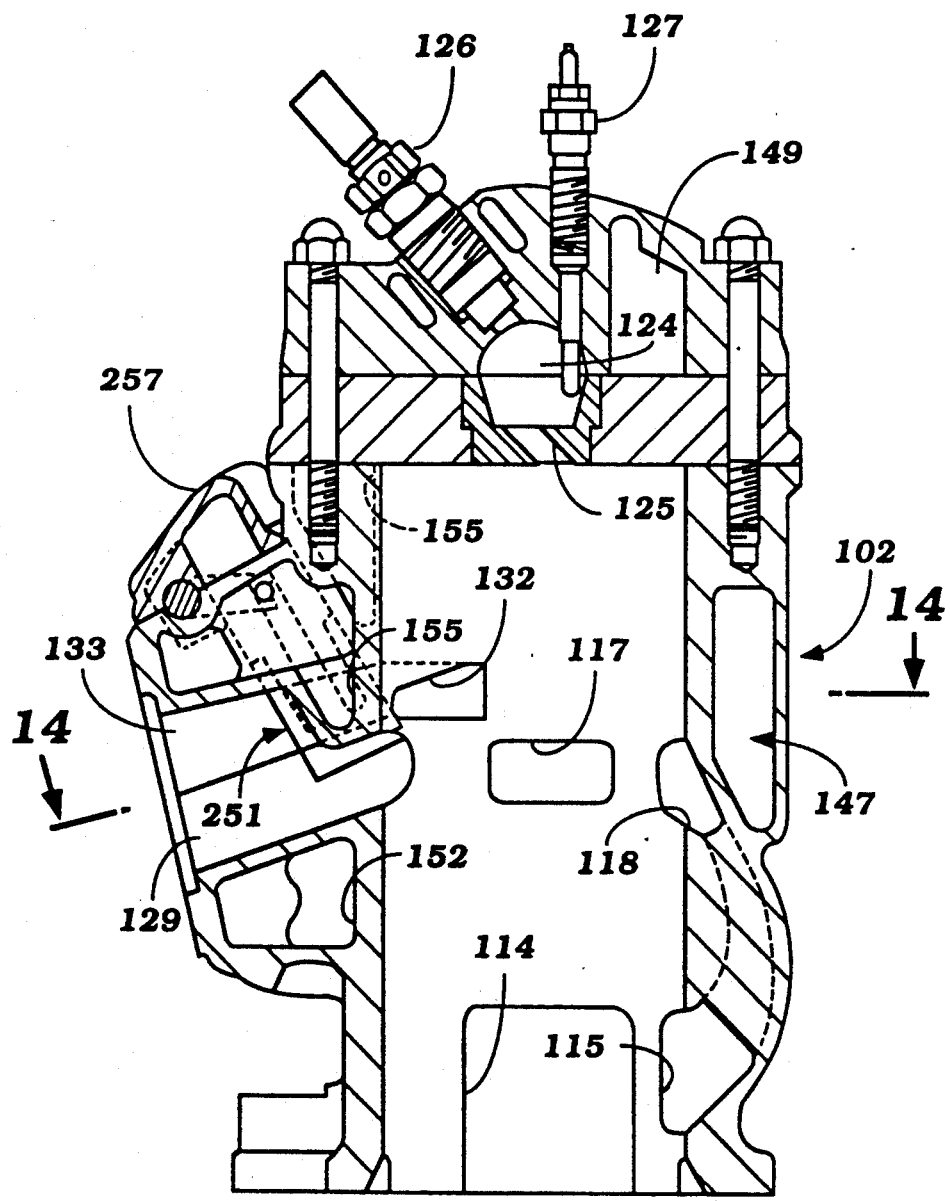
FIG. 13 is a partial cross sectional view, in part similar to FIG. 3, and shows another embodiment of the invention.

FIGS. 11 and 12 show another embodiment of the invention which differs from the FIGS. 3 through 10 only in the way the exhaust control valves 134 are coupled for rotation with each other. Because this is the only basic difference, only figures which correspond to FIG. 8 and a corresponding top view thereof from the previous embodiment are believed to be necessary to enable those skilled in the art to understand how this embodiment is constructed and operates. In this embodiment, the electric stepping motor 139 is again coupled to the shaft of one of the exhaust control valves 134. However, each exhaust control valve shaft portion 142 has affixed to it a respective pulley 201. The pulleys 201 are interlinked by a cross belt 202 so that rotation of one valve will be accompanied by rotation of the other valve in the opposite direction. In all other regards, this embodiment is the same as the previously described embodiment and, for that reason, further description of this embodiment is not believed to be necessary.

In the two embodiments of the invention as thus far described, rotary type exhaust control valves have been disclosed which rotate about axes that are disposed at small acute angles to the cylinder bore axis. FIGS. 13 through 18 show another embodiment of the invention which is basically the same as the previously described embodiments but wherein the exhaust control valves, indicated generally by the reference numeral 251 reciprocate in the bores 136 rather than rotate in them. Because this difference and the way in which the valves 251 are operated is the only difference from the previously described embodiments, those components which are the same as the previously described embodiments have been identified by the same reference numerals and will not be described again.

Figure 14:
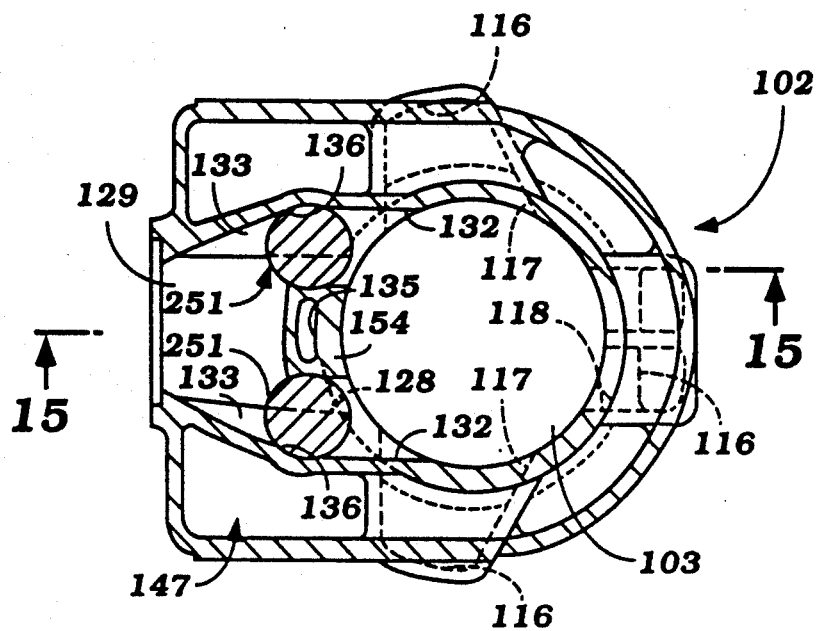
FIG. 14 is a cross sectional view taken along the line 14—14 of FIG. 13.
Figure 15:
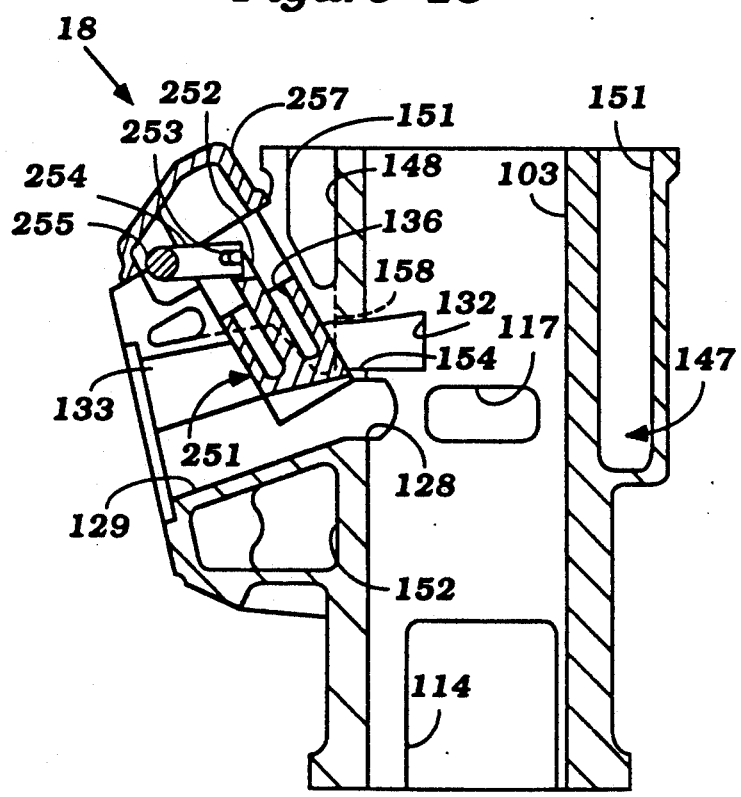
FIG. 15 is a cross sectional view taken along the line 15—15 of FIG. 14.
Figure 16:
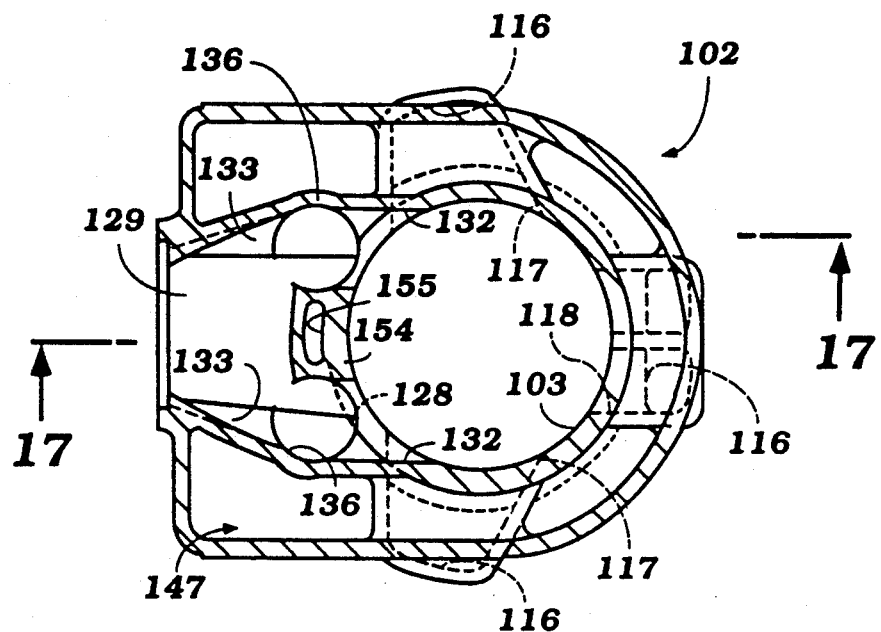
Figure 17:
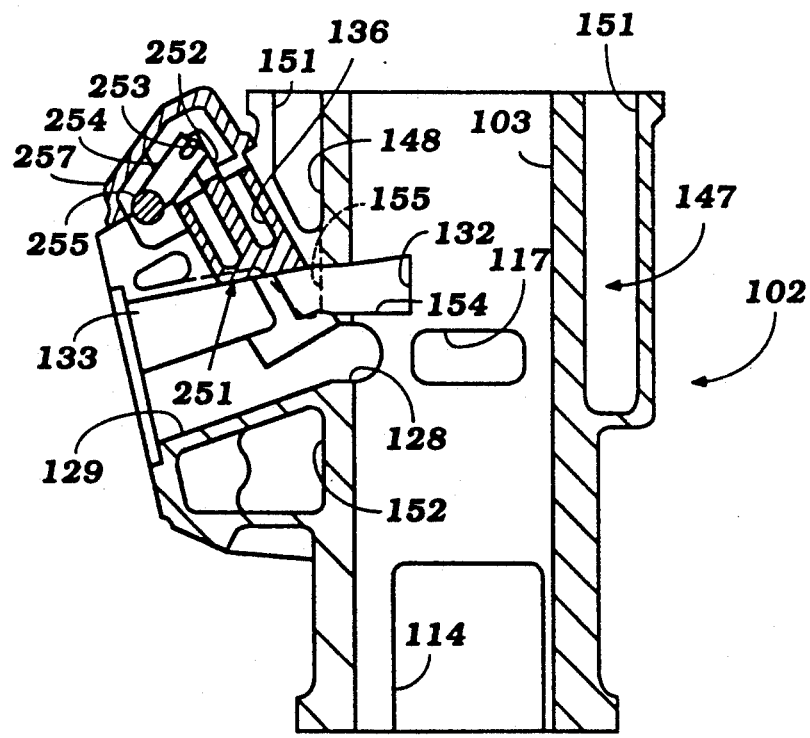
FIG. 17 is a cross sectional view taken along the line 17—17 of FIG. 16 and is in part similar to FIG. 15 but shows the exhaust control valves in their opened positions.
Figure 18:
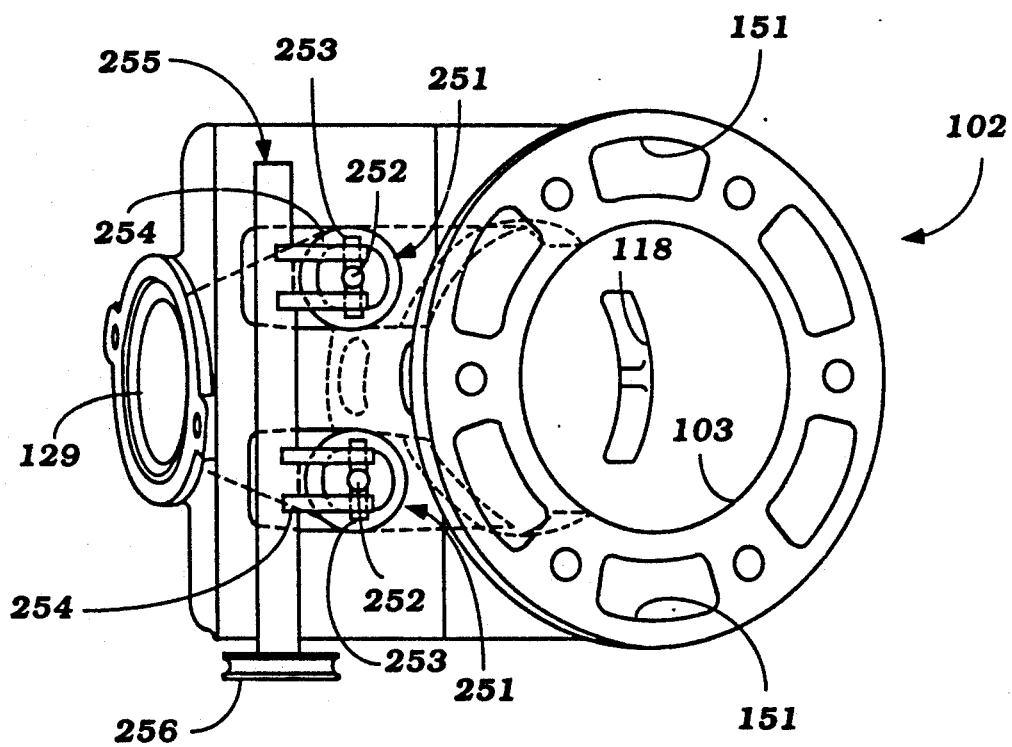
FIG. 18 is a view taken in the direction of the arrow 18 in FIG. 15 and shows the valve operating mechanism of this embodiment.

In this embodiment, each exhaust control valve 251 has an exhaust control stem 252 to which a cross pin 253 is affixed. The cross pin 253 is received in a slot in a forked lever 254 which is affixed to a control valve shaft 255 which is, in turn, journalled for rotation in the cylinder head in a suitable manner. A pulley 256 (FIG. 18) is affixed to one end of the control valve shaft 255 and is operated by a suitable stepping motor for moving the exhaust control valves 251 from their closed, high compression ratio positions as shown in FIGS. 14 and 15 to their raised, low compression ratio positions as shown in FIGS. 16 and 17. This mechanism is enclosed within a cover plate 257 which also serves to journal the control valve shaft 255.

Figure 19:
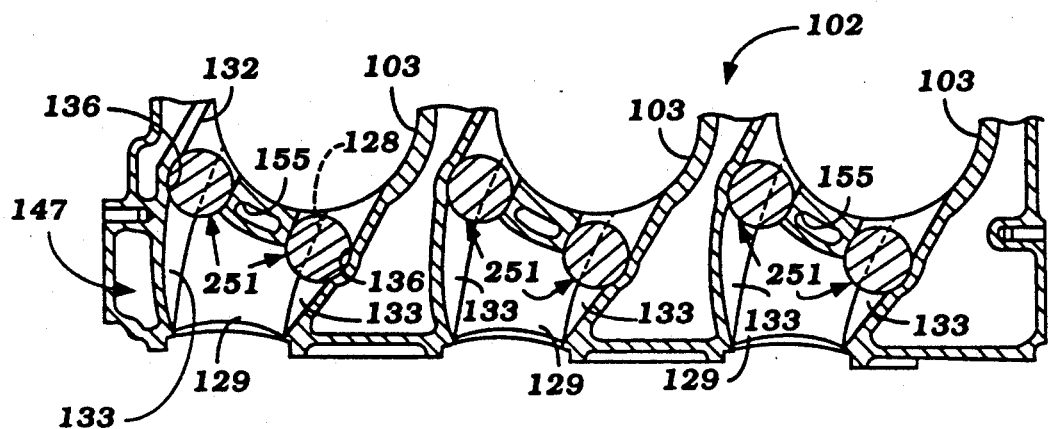
FIG. 19, is a partial cross sectional view, in part similar to FIG. 14, and shows how that embodiment can be employed in a multiple cylinder engine.
Figure 20:
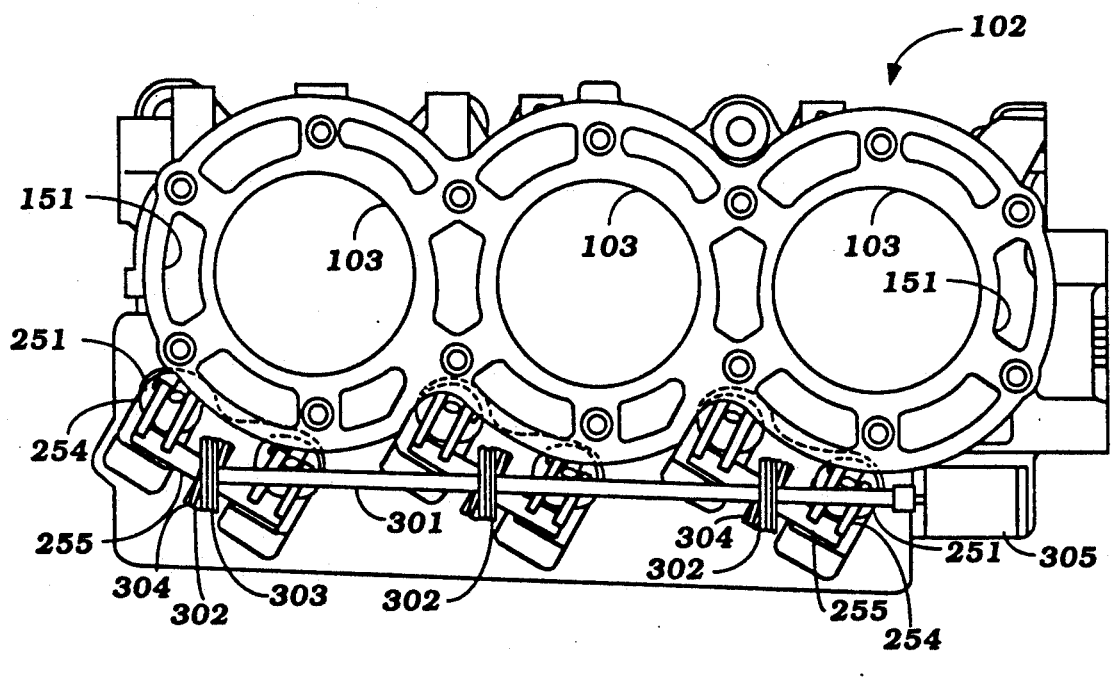
FIG. 20 is a top plane view, in part similar to FIG. 18, and shows how the valve operating mechanism is embodied in a multiple cylinder engine.
Figure 21:
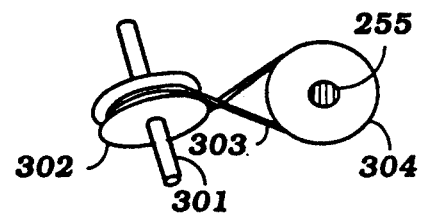
FIG. 21 is a view showing the connection between the valve operator and the valve actuating mechanisms in this embodiment.

In all of the embodiments of the invention as thus far described, the engine to which the invention has been applied has been depicted a being of a single cylinder type. It has been noted, however, that the method of application of the principal of each embodiment to a multiple cylinder engine is believed to be within the scope of one skilled in the art. However, FIGS. 19 through 21 show an embodiment using a valve of the type shown in FIGS. 14 through 18 as applied to a three cylinder inline engine. Since the construction of the basic engine is the same, except for the fact that there are three cylinders rather than one, the basic components of the engine have been identified by the same reference numerals and will not be described again. However, in order to permit the application of this principal to a multi-cylinder inline engine as still keep the engine relatively short in length, the main and auxiliary exhaust ports 129 and 133, which extend perpendicularly to a plane containing the cylinder bore axis and the axis of rotation of the crankshaft 107 in the single cylinder application are disposed at an acute angle to this plane as clearly seen in FIG. 19. This permits the cylinders to be positioned close to each other while still accommodating the side by side exhaust control valves 251.

Because of the angularly disposition of the exhaust passages 129 and 133, the control valve shafts 255 associated with the paired exhaust control valves 251 for each cylinder 103 are parallel to each other but not in line as clearly seen in FIG. 20. However, a single actuator shaft 301 is journalled in an appropriate manner in the cylinder block 102 and carries three individual pulleys 302 which rotate about a common axis. A flexible transmitter 303 is entrained around each pulley 302 and a further pulley 304 that is affixed to each control valve shafts 255. As a result of this relationship, it is possible to drive each of the angularly disposed control valve shafts 255 from a single actuator shaft 301. A servo or stepping motor 305 is disposed at one end of the engine for driving the actuator shaft 301 in accordance with a program as shown in FIG. 10.

Figure 22:
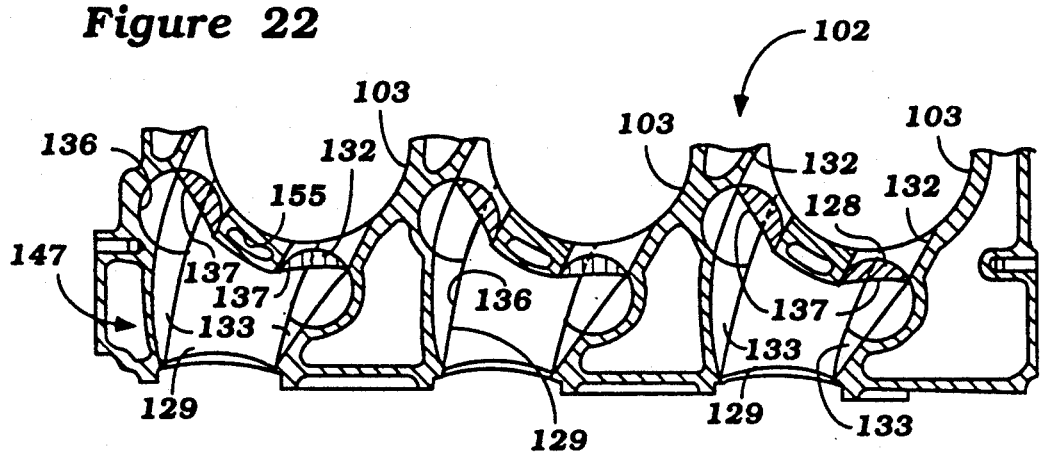
FIG. 22 is a partial cross sectional view, in part similar to FIG. 19, but shows how the embodiment of FIGS. 3 through 10 may be employed to a multiple cylinder engine.
Figure 23:
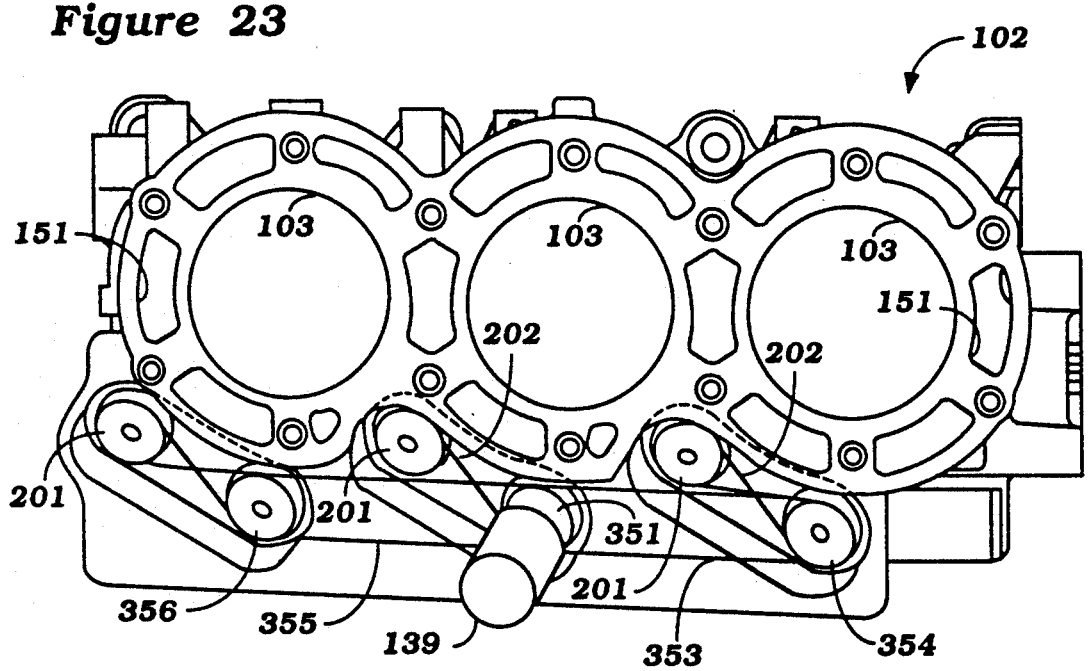
FIG. 23 is a top plane view showing the valve operating mechanism of this embodiment.
Figure 24:
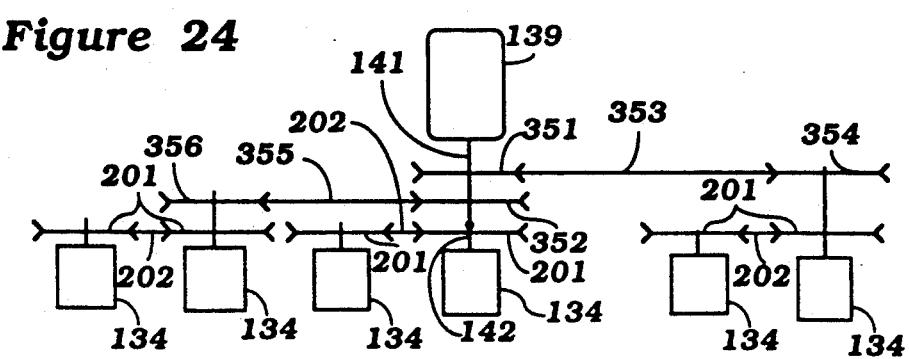
FIG. 24 is a schematic side elevational view showing how all of the exhaust control valves are operated by a single actuator.

FIGS. 22 through 24 show another embodiment of the invention and depict how a rotary type valve, as shown in FIGS. 3 through 10, can be applied to a multiple cylinder engines utilizing an interconnecting mechanism between the individual control valves 134 of the type shown in FIGS. 11 and 12. Again, because of the similarity of this embodiment to those previously described, components which are the same have been identified by the same reference numerals and will be described again only insofar as is necessary to understand the construction and operation of this embodiment.

In this embodiment, like the embodiment of FIGS. 19 through 21, the main and auxiliary exhaust ports 129 and 133 are disposed at an acute angle to the plane containing the axes of the cylinder bores 103 and the axis of rotation of the crankshaft 107. This, as has been noted, permits a compact overall length for the engine. Also, like the embodiments of FIGS. 11 and 12, the individual control valves 134 each of cylinder carry pulleys 201 that are interlinked by belts 202 for their common actuation.

In this embodiment a single actuator motor 139 has its output shaft 141 directly coupled to the shaft portion 142 of one of the valves 134. In this particular embodiment, this connection is to one of the valves 134 of the central most cylinder 103. The motor drive shaft 141 further carries a pair of pulleys 351 and 352. The pulley 351 drives a belt 353 that is coupled to a pulley 354 of the shaft of one of the valves 134 of one end cylinder. The pulley 352 drives a further belt 355 which drives a pulley 356 affixed to one of the valve shafts of the other end cylinder. In this way, all of the valves 134 are operated by a single drive motor 139.

Figure 25:
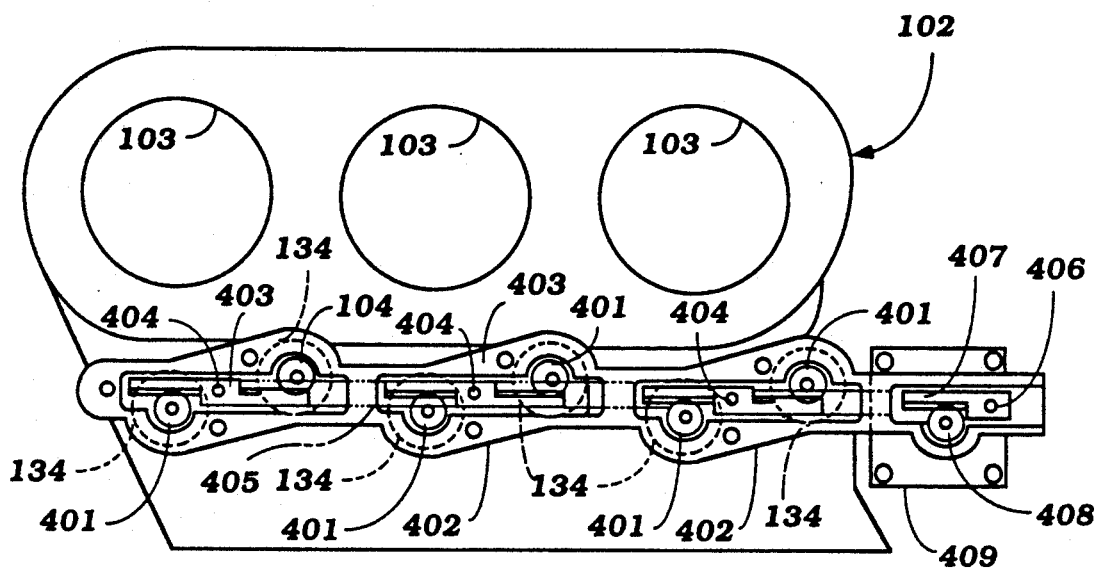
FIG. 25 is a top plane view, in part similar to FIG. 23, and shows another type of valve operating mechanism.
Figure 26:
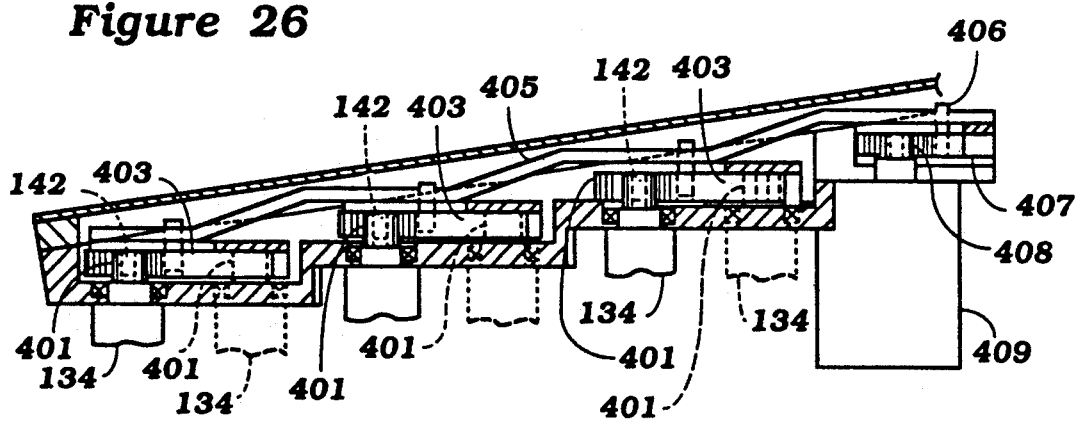
FIG. 26 is a partial cross sectional view showing this embodiment from a different angle.
Figure 27:
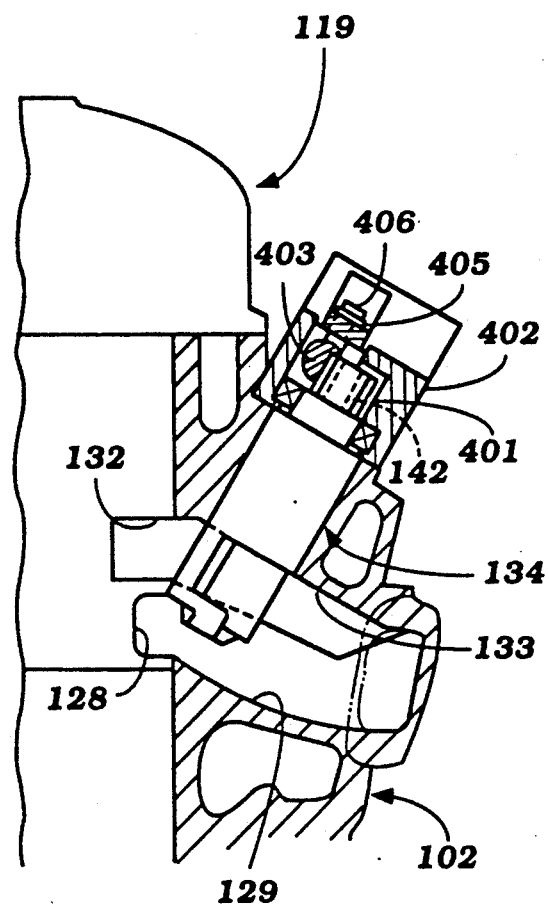
FIG. 27 is cross sectional view taken though one of the exhaust control valves of this embodiment.
Figure 28:
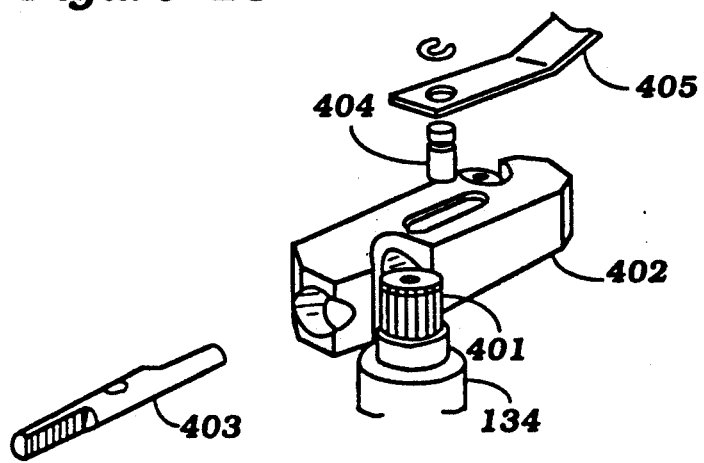
FIG. 28 is a partially exploded perspective view showing the actuator associated with a single exhaust control valve in this embodiment.
Figure 29:
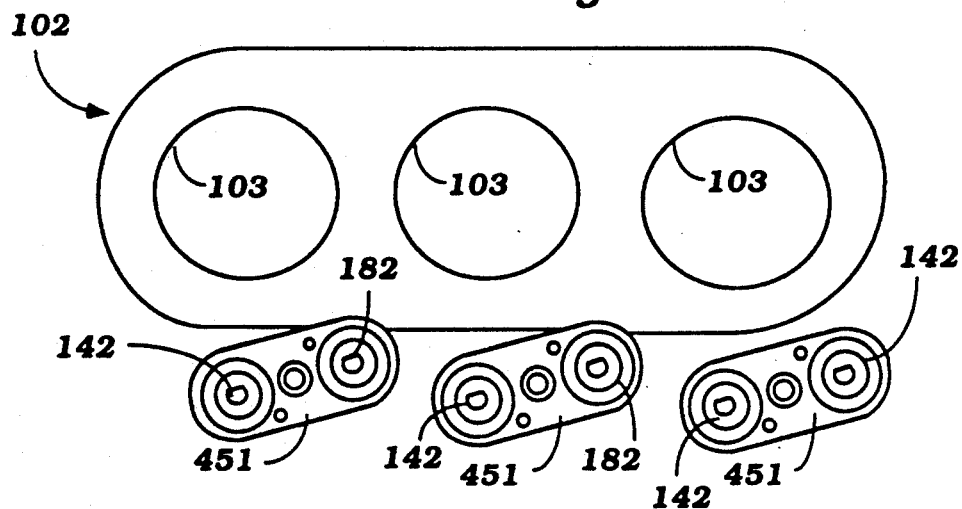
FIG. 29 is a top plane view, in part similar to FIGS. 23 and 35, and shows another type of valve actuator.
Figure 30:
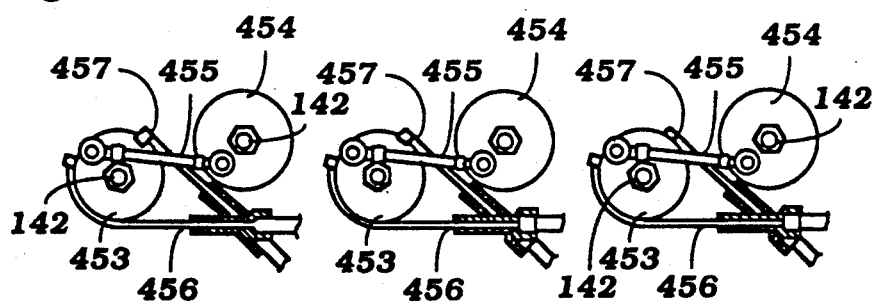
FIG. 30 is a partially schematic top plane view showing the valve actuator of this embodiment.

FIGS. 25 through 27 show another multi cylinder embodiment employing rotary type exhaust control valves 134 of the type shown in FIGS. 3 through 9. Again, because of the similarity of this embodiment to the previously described embodiments, those components which are the same have been identified by the same reference numerals.

In this embodiment, each valve stem portion 142 has affixed for rotation with it a pinion gear 401. These pinion gears 401 extend into recesses formed in a rack carrier 402 which is affixed to the side of the cylinder block 102 in an appropriate manner. A plurality of individual rack segments 403 are slideably supported in the rack carrier 402 in suitable bearing supports formed therein. Each rack segment 403 is engaged with the paired pinion gears 401 of the control valves of a single cylinder. It should be noted that the rack segments 402 have their rack-like teeth on opposite sides thereof so as to accommodate the angular disposition of the main exhaust passage 129 and the auxiliary exhaust passages 133 and also to acheive the rotation of the control valves 134 associated with each cylinder in opposite directions. This arrangement clearly is shown in FIG. 25.

Each rack segment 403 is formed with an upwardly extending drive pin 404 that is received within a respective appiture of a rack driver 405 which is slideably supported on the upper side of the rack carrier 402. The rack driver 405 extends beyond one end of the engine and is provided with a slot that receives a drive pin 406 that is fixed to a driving rack 407. The driving rack 407 has its teeth engaged with a pinion gear 408 that is affixed to the drive shaft of a stepper motor 409 mounted at one end of the engine. As a result and as should be readily apparent, rotation of the drive motor 409 will effect reciprocation of the rack segments 403 and opening and closing movement of each of the exhaust control valves 134.

Figure 31:
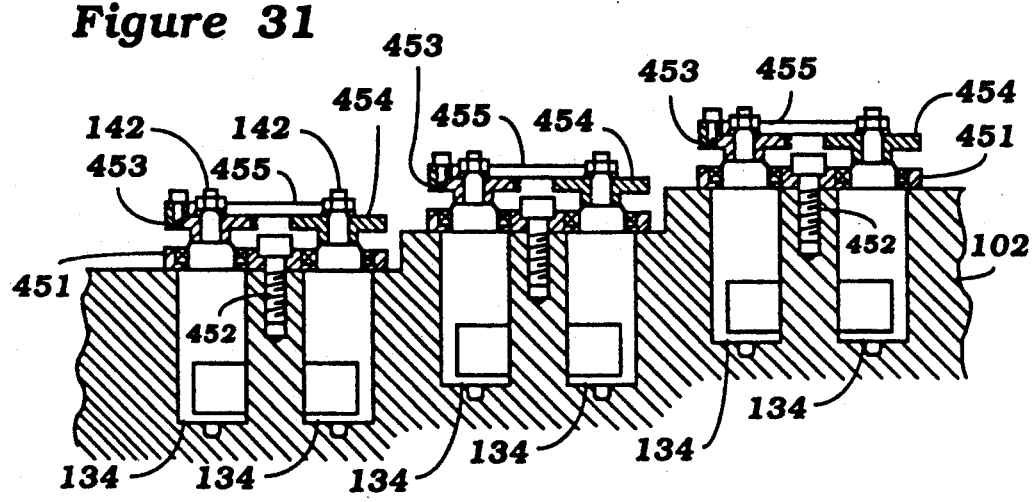
FIG. 31 is a cross sectional view showing this embodiment.

FIGS. 39 through 31 show a still further embodiment of the invention employing a rotary type of control valve as with the embodiment of FIGS. 3 through 10. Again, due to the similarity of this embodiment to the previously described embodiments, components which are the same have been identified by the same reference numeral and will not be described again. Also, to apply the principal to a multiple cylinder engine, the main and auxiliary exhaust passages 129 and 133 are disposed at an acute angle to the claim containing the axes of the cylinder bores 133.

In this embodiment, the exhaust control valves 134 associated with each cylinder have their stem portions 142 rotatably journalled in a support plate 451 that is affixed to an upper surface of the cylinder block 102 by means of threaded fasteners 452. A pulley 453 is affixed to one of these valve stems while a disc 454 is affixed to the other valve stem of the pair. The pulley 453 and disc 454 of each pair is interconnecting for simultaneous rotation by a link 455. Because of the way in which the link 455 is connected to the pulley 453 and disc 454 the valves 134 will rotate in opposite senses, as with each previously described embodiment.

A pair of wire actuators 456 and 457 are connected to each of the pulleys 453. The wire actuators 456 and 457 are, in turn, connected at their opposite ends to respective pulleys (not shown) affixed to the output shaft of a stepping motor. As a result of the use of the wire actuators, there is more latitude in the placement of the controlling stepping motor than with the previously described embodiments.

It should be readily apparent that the embodiments of the invention as thus far described are extremely effective in providing a very good control arrangement for altering the compression ratio of a two cycle internal combustion engine while at the same time permitting high compression ratios because of lack of any dead space in the auxiliary exhaust passages and also which affords good cooling of not only the auxiliary exhaust passages and control valves but also of the main exhaust passage. Also, the embodiments applied to multiple cylinder engines permits a very compact engine construction.

Of course, the embodiments of the invention as described are preferred embodiments but various changes and modifications may be made without departing from the spirit and scope and invention, as defined by the appended claims.

I claim:

1. In a two cycle internal combustion engine comprising a cylinder having an opening for receiving a reciprocating piston, a main exhaust port opening through said cylinder and opened and closed by said piston, a pair of auxiliary exhaust ports spaced around said cylinder and opened and closed by said piston, said auxiliary exhaust ports being opened by the movement of said piston before said main exhaust port is opened by said piston, and exhaust control valves for selectively closing said auxiliary exhaust ports for raising the effective compression ratio of said engine such that a line extending between the inner peripheral edges of said exhaust control valves when in their closed position intersecting said cylinder opening.

2. In a two cycle internal combustion engine as set forth in claim 1 wherein a main exhaust passage extends through the cylinder from the main exhaust port and auxiliary exhaust passages extend through the cylinder from the auxiliary exhaust ports and the main and auxiliary exhaust passages merge with each other downstream of the exhaust control valves.

3. In a two cycle internal combustion engine as set forth in claim 1 wherein the exhaust control valves each comprise a valve element supported for movement in a bore formed in the cylinder and wherein the bore is disposed substantially parallel to a plane containing the axis of the cylinder opening and the rotational axis of an engine output shaft.

4. In a two cycle internal combustion engine as set forth in claim 3 wherein the bores are disposed at a acute angle to the plane.

5. In a two cycle internal combustion engine as set forth in claim 3 wherein the valve elements reciprocate in the respective bores.

6. In a two cycle internal combustion engine as set forth in claim 5 wherein the bores are disposed at a acute angle to the plane.

7. In a two cycle internal combustion engine as set forth in claim 5 further including a common actuator for actuating each of the valve elements between its closed and its opened positions.

8. In a two cycle internal combustion engine as set forth in claim 7 wherein the valve elements are reciprocated by a common actuating shaft journalled for rotation relative to the cylinder and having a pin and slot connection to the valve elements.

9. In a two cycle internal combustion engine as set forth in claim 3 wherein the valve elements rotate in their respective bores between their opened and closed positions.

10. In a two cycle internal combustion engine as set forth in claim 9 wherein the bores are disposed at an acute angle to the plane.

11. In a two cycle internal combustion engine as set forth in claim 9 wherein the valve elements are operated by a common actuator.

12. In a two cycle internal combustion engine as set forth in claim 11 wherein the common actuator directly operates one of the valve elements and the one valve element has a geared connection to the other valve element.

13. In a two cycle internal combustion engine as set forth in claim 12 wherein the gear connection comprises a plurality of intermeshing pinion gears.

14. In a two cycle internal combustion engine as set forth in claim 12 wherein the gear connection comprises a rack and pinion connection with each of the valve elements having a pinion gear affixed for rotation therewith.

15. In a two cycle internal combustion engine as set forth in claim 11 wherein the valve elements are interconnected by means of a flexible transmitter for common movement.

16. In a two cycle internal combustion engine as set forth in claim 2 wherein the engine has a multiple aligned cylinders each with main and auxiliary exhaust ports and exhaust passages and control valves.

17. In a two cycle internal combustion engine as set forth in claim 16 wherein the main exhaust passages from each cylinder are disposed at an acute angle to a plane containing the axes of the respective cylinder openings.

18. In a two cycle internal combustion engine as set forth in claim 17 wherein the exhaust control valves each comprise a valve element supported for movement in a bore formed in the cylinder and wherein the bore is disposed substantially parallel to a plane containing the axis of the cylinder opening and the rotational axis of an engine output shaft.

19. In a two cycle internal combustion engine as set forth in claim 18 wherein the bores are disposed at an acute angle to the plane.

20. In a two cycle internal combustion engine as set forth in claim 18 wherein the valve elements reciprocate in the respective bores.

21. In a two cycle internal combustion engine as set forth in claim 20 wherein the bores are disposed at an acute angle to the plane.

22. In a two cycle internal combustion engine as set forth in claim 20 further including a common actuator for actuating each of the valve elements between its closed and its opened positions.

23. In a two cycle internal combustion engine as set forth in claim 22 wherein the valve elements are reciprocated by a common actuating shaft journalled for rotation relative to the cylinder and having a pin and slot connection to the valve elements.

24. In a two cycle internal combustion engine as set forth in claim 18 wherein the valve elements rotate in their respective bores between their opened and closed positions.

25. In a two cycle internal combustion engine as set forth in claim 24 wherein the bores are disposed at an acute angle to the plane.

26. In a two cycle internal combustion engine as set forth in claim 24 wherein the valve elements are operated by a common actuator.

27. In a two cycle internal combustion engine as set forth in claim 26 wherein the common actuator directly operates one of the valve elements and the one valve element has a geared connection to the other valve element.

28. In a two cycle internal combustion engine as set forth in claim 27 wherein the gear connection comprises a plurality of intermeshing pinion gears.

29. In a two cycle internal combustion engine as set forth in claim 27 wherein the gear connection comprises a rack and pinion connection with each of the valve elements having a pinion gear affixed for rotation therewith.

30. In a two cycle internal combustion engine as set forth in claim 26 wherein the valve elements are interconnected by means of a flexible transmitter for common movement.

31. In a two cycle internal combustion engine as set forth in claim 2 further including a cooling jacket formed in the portion of the cylinder extending between the auxiliary exhaust passages.

32. In a two cycle internal combustion engine as set forth in claim 31 wherein the cooling jacket is positioned in proximity to the auxiliary exhaust passages, the exhaust control valves, and the main exhaust passage.

33. In a two cycle internal combustion engine comprising a cylinder having an opening for receiving a reciprocating piston, a main exhaust port opening in said cylinder and opened and closed by said piston, a pair of auxiliary exhaust ports spaced around said cylinder and opened and closed by said piston, said auxiliary exhaust ports being opened by the movement of said piston before said main exhaust port is opened by said piston, exhaust control valve means for selectively closing said auxiliary exhaust ports for raising the effective compression ratio of said engine, said auxiliary exhaust ports communicating with auxiliary exhaust passages formed in said cylinder, said main exhaust port communicating with a main exhaust passage formed in said cylinder, said main and said auxiliary exhaust passages communicating with each other downstream of said exhaust control valves, and a cooling jacket formed in said cylinder between said auxiliary exhaust passages.

34. In a two cycle internal combustion engine as set forth in claim 33 wherein the cooling jacket is positioned in proximity to the auxiliary exhaust passages, the exhaust control valves, and the main exhaust passage.

35. In a two cycle internal combustion engine as set forth in claim 34 wherein the exhaust control valves each comprise a control member supported for movement in a bore formed in the cylinder and wherein the bore is disposed substantially parallel to a plane containing the axis of the cylinder opening and the rotational axis of an engine output shaft.

36. In a two cycle internal combustion engine as set forth in claim 35 wherein the bores are disposed at an acute angle to the plane.

37. In a two cycle internal combustion engine as set forth in claim 35 where the valve elements reciprocate in the respective bores.

38. In a two cycle internal combustion engine as set forth in claim 36 wherein the bores are disposed at an acute angle to the plane.

39. In a two cycle internal combustion engine as set forth in claim 37 further including a common actuator for actuating each of the valve elements between its closed and its opened positions.

40. In a two cycle internal combustion engine as set forth in claim 39 wherein the valve elements are reciprocated by a common actuating shaft journalled for rotation relative to the cylinder and having a pin and slot connection to the valve elements.

41. In a two cycle internal combustion engine as set forth in claim 35 wherein the valve elements rotate in their respective bores between their opened and closed positions.

42. In a two cycle internal combustion engine as set forth in claim 41 wherein the bores are disposed at an acute angle to the plane.

43. In a two cycle internal combustion engine as set forth in claim 41 wherein the valve elements are operated by a common actuator.

44. In a two cycle internal combustion engine as set forth in claim 43 wherein the common actuator directly operates one of the valve elements and the one valve element has a geared connection to the other valve element.

45. In a two cycle internal combustion engine as set forth in claim 44 wherein the gear connection comprises a plurality of intermeshing pinion gears.

46. In a two cycle internal combustion engine as set forth in claim 44 wherein the gear connection comprises a rack and pinion connection with each of the valve elements having a pinion gear affixed for rotation therewith.

47. In a two cycle internal combustion engine as set forth in claim 43 wherein the valve elements are interconnected by means of a flexible transmitter for common movement.

48. In a two cycle internal combustion engine as set forth in claim 34 wherein the engine has a multiple aligned cylinders each with main and auxiliary exhaust ports and exhaust passages and control valves.

49. In a two cycle internal combustion engine as set forth in claim 48 wherein the main exhaust passages from each cylinder are disposed at an acute angle to a plane containing the axes of the respective cylinder openings.

* * * * *